US011686362B2

(12) United States Patent
Shalouf

(10) Patent No.: US 11,686,362 B2
(45) Date of Patent: Jun. 27, 2023

(54) SHOCK ABSORBER STAND

(71) Applicant: SAUDI ARABIAN OIL COMPANY, Dhahran (SA)

(72) Inventor: Fathalla Shalouf, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 295 days.

(21) Appl. No.: 17/038,320

(22) Filed: Sep. 30, 2020

(65) Prior Publication Data

US 2022/0099152 A1 Mar. 31, 2022

(51) Int. Cl.
*E21B 15/00* (2006.01)
*F16F 3/10* (2006.01)

(52) U.S. Cl.
CPC ............. *F16F 3/10* (2013.01); *E21B 15/00* (2013.01); *F16F 2224/025* (2013.01); *F16F 2232/08* (2013.01); *F16F 2236/04* (2013.01)

(58) Field of Classification Search
CPC ............. E21B 15/00; F16F 7/09; F16F 13/04
USPC ................. 267/195, 201–203, 33, 134, 135; 248/618–624, 678
See application file for complete search history.

(56) References Cited

U.S. PATENT DOCUMENTS

| | | | |
|---|---|---|---|
| 2,934,905 A | 5/1960 | Woolslayer et al. | |
| 4,662,788 A | 5/1987 | Kypke et al. | |
| 4,848,967 A | 7/1989 | Weyler | |
| 4,930,938 A | 6/1990 | Rawstron et al. | |
| 5,553,977 A | 9/1996 | Andersen et al. | |
| 5,658,095 A | 8/1997 | Arlt et al. | |
| 2005/0194189 A1* | 9/2005 | Barnes | E21B 7/02 175/122 |
| 2010/0316450 A1 | 12/2010 | Botwright | |
| 2013/0305632 A1 | 11/2013 | Rivera, Sr. et al. | |

(Continued)

FOREIGN PATENT DOCUMENTS

| | | |
|---|---|---|
| CN | 205171483 U | 4/2016 |
| CN | 109538116 A | 3/2019 |

(Continued)

OTHER PUBLICATIONS

International Search Report and Written Opinion of the International Searching Authority issued in corresponding International Application No. PCT/US2020/056806, dated May 12, 2021 (14 pages).

(Continued)

*Primary Examiner* — Giovanna Wright
(74) *Attorney, Agent, or Firm* — Osha Bergman Watanabe & Burton LLP

(57) ABSTRACT

A shock stand absorber includes a resilient layer disposed on a planar frame structure and a plurality of vertical supports positioned to support the planar frame structure from below. Each of the vertical supports includes a resilient member between a first vertical support member and a second vertical support member in a telescoping arrangement. The resilient member is deformable in response to a telescoping movement between the first vertical support member and the second vertical support member. A plurality of connecting webs are formed between the vertical supports. The plurality of vertical supports are longitudinally aligned with a plurality of points on one or more paths defined on the bottom side of the planar frame structure.

19 Claims, 10 Drawing Sheets

(56) References Cited

U.S. PATENT DOCUMENTS

2017/0241126 A1 8/2017 Konduc et al.
2019/0071830 A1 3/2019 Lindblade et al.

FOREIGN PATENT DOCUMENTS

| CN | 208966206 U | 6/2019 |
|---|---|---|
| KR | 20100116446 A | 11/2010 |
| KR | 101083693 B1 | 11/2011 |
| KR | 20180019914 A | 2/2018 |
| WO | 2016051120 A2 | 4/2016 |

OTHER PUBLICATIONS

"Shock absorbers ease deck-jacket transfer: Heavyweight platforms are subject to extra stresses during float-over oper-ations", Offshore, Endeavor Business Media, LLC, May 2004, URL:<https://www.offshore-mag.com/rigs-vessels/article/16756877/shock-absorbers-ease-deckjacket-transfer> (3 pages).

* cited by examiner

SHOCK ABSORBER STAND

BACKGROUND

An oil rig generally refers to an integrated system for performing various operations such as sampling subsurface mineral deposits, testing physical properties of the deposits, and installing subsurface fabrications which may include underground tunnels and utilities. Oil rigs often include a mast disposed on a substructure and a hoisting assembly coupled to the mast via wires for raising or lowering operations of the mast. Once a location is determined on the earth's surface, an oil rig is installed at the location, and the mast is raised to an operating position. The mast stays erected while drilling equipment carries out intended operations. When the mast is no longer needed at the operation site, the mast can be lowered down to a horizontal orientation and transported to another operation site.

SUMMARY

In a first summary example, an apparatus includes a planar frame structure having a top side and a bottom side. A resilient layer is disposed on the top side. A plurality of vertical supports are positioned to support the planar frame structure from below. Each of the vertical supports has a first vertical support member and a second vertical support member in a telescoping arrangement. A resilient member is positioned between the first vertical support member and the second vertical support member. The first vertical support member is coupled to the bottom side of the planar frame structure. The resilient member is deformable in response to a telescoping movement between the first vertical support member and the second vertical support member. A plurality of connecting webs are formed between the vertical supports.

The planar frame structure may include a plurality of bar structures including pipes and beams. Each beam may have an upper flange and a lower flange integrally connected with a web for resistance to loading in a vertical axis of the beam and to bending about an axis perpendicular to both a longitudinal axis and the vertical axis of the beam. Each of the beams may be connected such that the upper flanges of the beams form the top side and the lower flanges of the beams form the bottom side. The resilient layer may include a plurality of layers of different hardness stacked to conform to the top side. The plurality of layers may be harder in a lower portion than in an upper portion of the resilient layer.

The second vertical support member may be a hollow structure having an open longitudinal end and a closed longitudinal end. The resilient member may be fixed to the closed longitudinal end. The first vertical support member may include an upper longitudinal end coupled to the bottom side and a lower longitudinal end in contact with the resilient member. An inner diameter of the second vertical support member may be larger than an outer diameter of the first vertical support member by a clearance. The plurality of vertical supports may be longitudinally aligned with a plurality of points on one or more paths defined on the bottom side of the planar frame structure. The number of points may be related to a size of a mast.

The plurality of connecting webs may be a truss structure connected to lateral sides of adjacent vertical supports to maintain the plurality of vertical supports in a vertical orientation.

In a second summary example, a system of an oil rig includes a mast with a target point and a contact side. An external drive is coupled to the mast. An apparatus of the system includes a planar frame structure having a top side and a bottom side. A resilient layer is disposed on the top side. A plurality of vertical supports are positioned to support the planar frame structure from below. Each of the vertical supports has a first vertical support member and a second vertical support member in a telescoping arrangement. A resilient member is positioned between the first vertical support member and the second vertical support member. The first vertical support member is coupled to the bottom side of the planar frame structure. The resilient member is deformable in response to a telescoping movement between the first vertical support member and the second vertical support member. A plurality of connecting webs are formed between the vertical supports. The apparatus is disposed near the mast to prevent the mast from falling onto a ground.

The planar frame structure may include a plurality of bar structures including pipes and beams. Each beam may have an upper flange and a lower flange integrally connected with a web for resistance to loading in a vertical axis of the beam and to bending about an axis perpendicular to both a longitudinal axis and the vertical axis of the beam. Each of the beams may be connected such that the upper flanges of the beams form the top side and the lower flanges of the beams form the bottom side. The resilient layer may include a plurality of layers of different hardness stacked to conform to the top side. The plurality of layers may be harder in a lower portion than in an upper portion of the resilient layer.

The second vertical support member may be a hollow structure having an open longitudinal end and a closed longitudinal end. The resilient member may be fixed to the closed longitudinal end. The first vertical support member may include an upper longitudinal end coupled to the bottom side and a lower longitudinal end in contact with the resilient member. An inner diameter of the second vertical support member may be larger than an outer diameter of the first vertical support member by a clearance. The plurality of vertical supports may be longitudinally aligned with a plurality of points on one or more paths defined on the bottom side of the planar frame structure. The number of points may be related to a size of a mast.

The plurality of connecting webs may be a truss structure connected to lateral sides of adjacent vertical supports to maintain the plurality of vertical supports in a vertical orientation.

In a third summary example, a method includes determining a location on a floor of a rig site corresponding to a target point of a mast pivotally coupled to a substructure at the rig site when the mast is oriented horizontally relative to the floor. The method includes positioning a shock absorber stand at the location. The method includes pivoting the mast to raise or lower the mast relative to the floor. The method includes absorbing a shock resulting from a collision of the mast with the shock absorber stand during pivoting of the mast. The absorbing occurs by a resilient layer of the shock absorber stand positioned to contact the mast during the collision. The absorbing occurs by a plurality of resilient members positioned in a plurality of telescoping vertical supports of the shock absorber stand.

The method may include transporting the mast oriented horizontally relative to the floor and supported by the shock absorber stand at the location to a different location.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. For the sake of continuity, and in the interest of conciseness, same or similar reference characters may be used for same or similar objects in multiple figures. Further, the particular shapes of the elements as drawn are not necessarily intended to convey any information regarding the actual shape of the particular elements and have been solely selected for ease of recognition in the drawing.

DETAILED DESCRIPTION

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with the safety system has not been shown or described in detail to avoid unnecessarily obscuring descriptions of the implementations and embodiments.

A shock absorber stand in accordance with one or more embodiments may be positioned on a floor at a rig site to prevent a mast from falling onto the floor during raising or lowering of the mast. As the mast relies on a hoisting assembly during raising or lowering of the mast, any failures in the hoisting assembly performing raising or lowering operations of the mast may lead to an uncontrolled fall of the mast towards the floor, causing damages to the mast. To prevent such damages due to the mast falling onto the floor, or onto equipment or personnel on the floor during raising and lowering of the mast, the shock absorber stand may be positioned on the floor and near the mast to catch the mast if needed.

Figure 1:
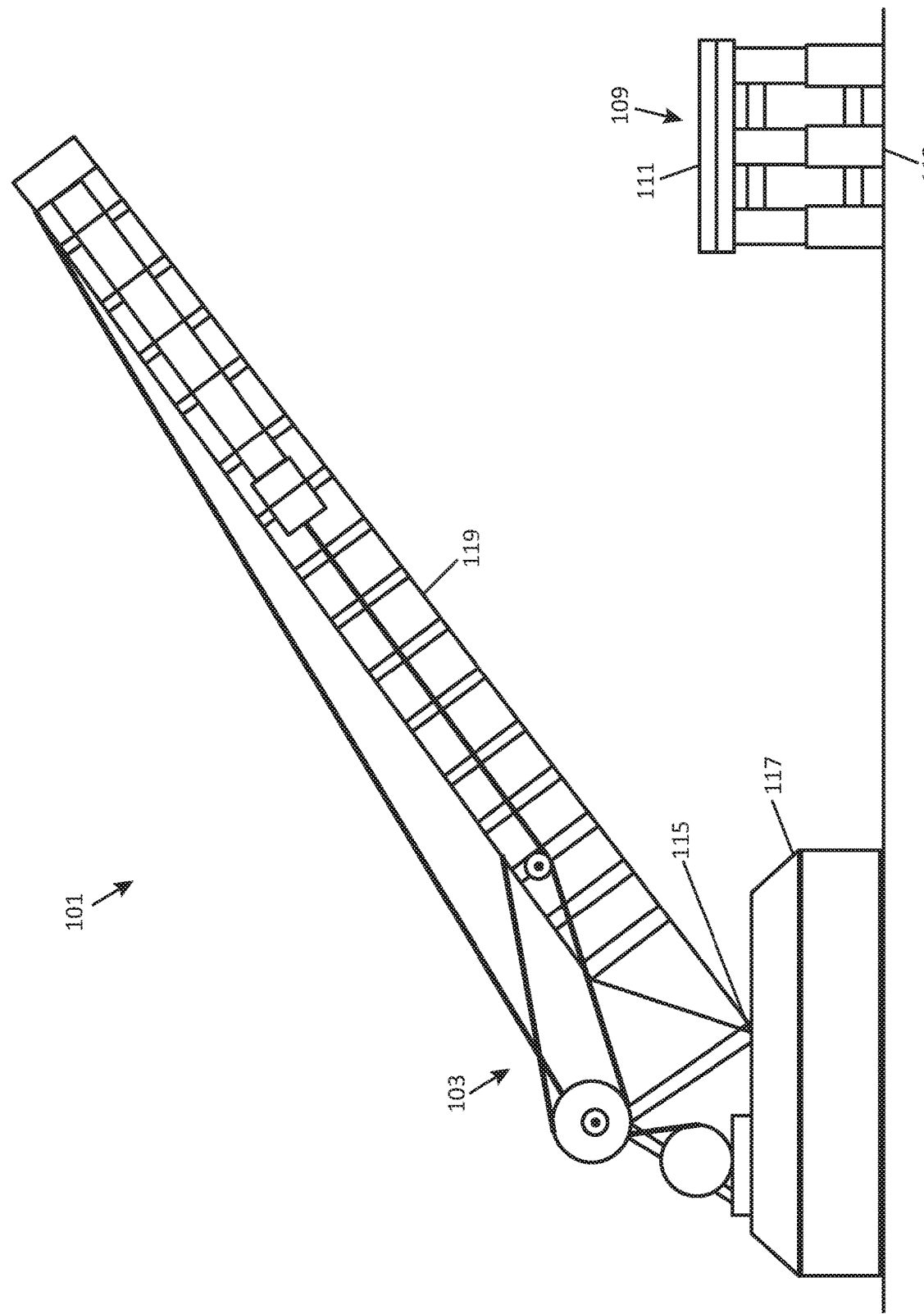
FIG. 1 shows a system in accordance with one or more embodiments.

For example, FIG. 1 shows a portion of an oil rig 101 installed at a rig site. The oil rig 101 may include a substructure 117 which supports a mast 119, a pulley system 103 coupled to the mast 119 via wires, and other drilling equipment (not shown). The mast 119 may be coupled to the substructure 117 via a pivot joint 115. By rotating the mast 119 about the pivot joint 115 using the pulley system 103, the mast 119 may be erected to a vertical orientation for rig operations or to a substantially horizontal orientation for stowing away. During erection or lowering of the mast 119, the mast 119 may be subject to an uncontrollable fall due to failures (e.g., a failure in power supply, a fatigue failure in one of the internal components of the pulley system 103, or human error), which jeopardize the operation site including operators and other drilling equipment near the mast 119. A shock absorber stand 109 as described herein may be disposed near the mast 119 at a pre-determined location 113 to catch the mast 119 if the mast 119 falls uncontrollably while minimizing damages to the mast 119.

Figure 2:
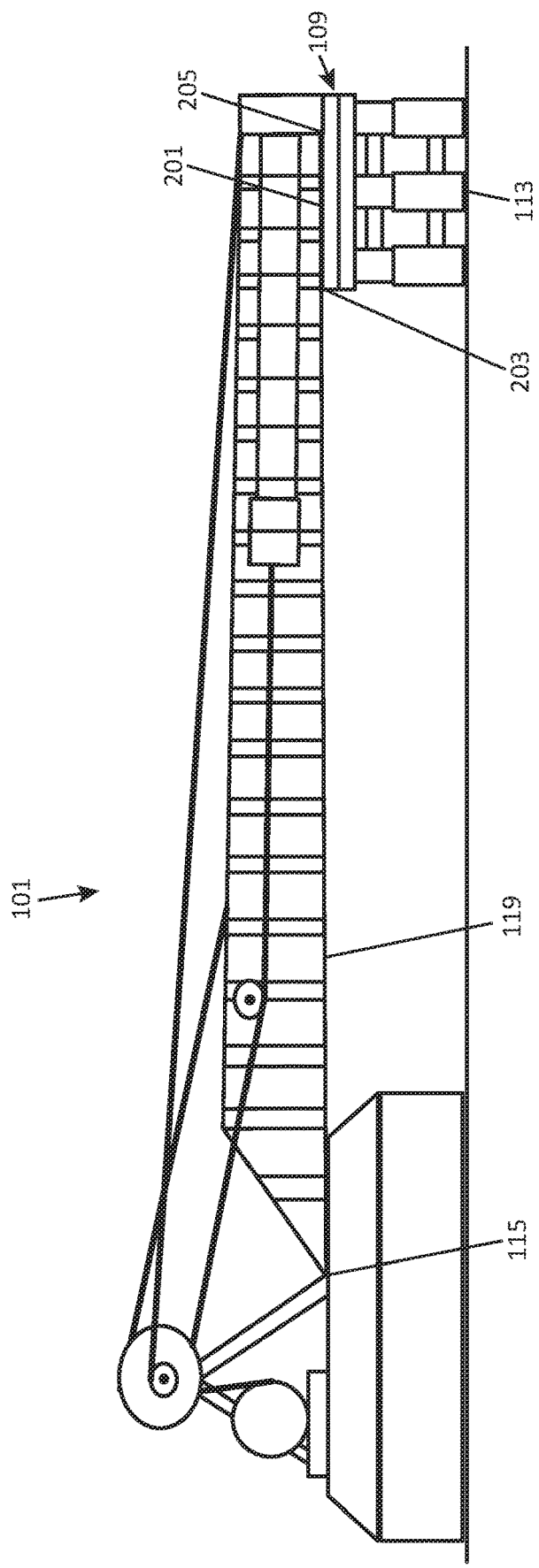
FIG. 2 shows a system in accordance with one or more embodiments.

Specifically, FIG. 2 shows the shock absorber stand 109 positioned at the pre-determined location 113 and the mast 119 that has fallen onto the shock absorber stand 109. During the collision between the mast 119 and the shock absorber stand 109, the loads imposed due to the uncontrollable fall of the mast 119 is absorbed by the shock absorber 109, thereby minimizing the damages to the mast 119. Absorption of the loads is optimized with particular designs of the shock absorber 109. For example, a contact side 201 of the mast 119 and a contact layer 203 of the shock absorber stand 109 are substantially parallel to each other for evenly distributing the load imposed on the contact side 201. Further, the predetermined location 113 of the shock absorber stand 109 may correspond to a target point 205 on the contact side 201 such that when the mast 119 falls on the contact layer 203, the shock absorber stand 109 supports the target point 205 on the mast 119. The target point 205 may be a point on the mast 119 that minimizes internal load of the mast 119 when the mast 119 is laid horizontally, thereby minimizing damages to the mast 119. For example, the shock absorber stand 109 may be positioned to support a target point 205 that is proximate a tip of the mast 119. A method of using the shock absorber stand 109 may include determining a location on the floor of the rig site that will correspond to the target point 205 of the mast 119 when the mast 119 is oriented horizontally relative to the floor from the pivot joint 115. This location can serve as the pre-determined location 113 for placement of the shock absorber stand 109. However, the shock absorber stand 109 is not limited to catching the mast 119 during an uncontrolled fall of the mast 119. The shock absorber stand 109 may also be used when the mast 119 is being lowered towards the floor in a controlled manner or to support the mast 119 when the mast 119 is in a substantially horizontal orientation.

Figure 3:
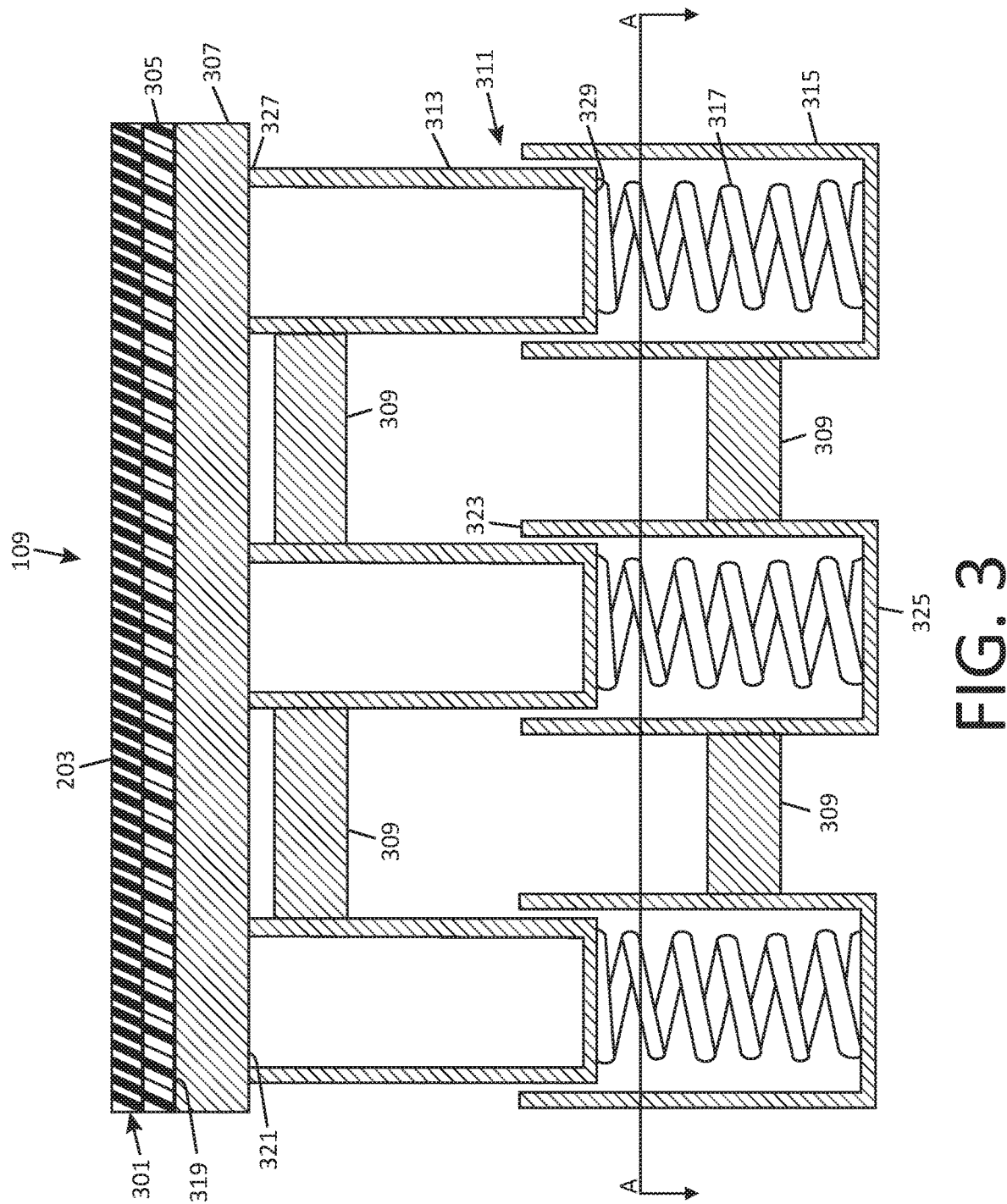
FIG. 3 shows a cross sectional view of an apparatus in accordance with one or more embodiments.

Referring to FIG. 3, the shock absorber stand 109 in accordance with one or more embodiments may include a planar frame structure 307, a resilient layer 301 disposed on a top side 319 of the planar frame structure 307, a plurality of vertical supports 311, and a plurality of connecting webs 309. The resilient layer 301 may include a contact layer 203 and one or more lower layers 305 to absorb impacts if an object falls on the contact layer 203 (e.g., the mast 119 in FIGS. 1 and 2). For example, a resilient layer 301 in accordance with one or more embodiments may be a combination of layers that may include materials having different material hardness. Specifically, materials with relatively low hardness may be used for the contact layer 203 on top of the resilient layer 301 to allow the falling object to indent the contact layer 203 while materials with a higher hardness compared to the contact layer 203 may be used for layer(s) 305 placed below the contact layer 203 for increasing the resistance to the indentation as the falling object continues indenting downward. For example, the resilient layer 301 may have the contact layer 203 made of soft rubbers and have the lower layer(s) 305 made of hard rubbers or semi-rigid plastics. Such configuration of the resilient layer 301 may minimize the impacts imposed on the contact side 201 of the mast 119 when the mast 119 falls uncontrollably on the shock absorber stand 109, thereby minimizing damages to the mast 119.

The resilient layer 301 may be cut and sized to conform with the top side 319 of the planar frame structure 307. The properly sized resilient layer 301 may be coupled to the top side 319 by conventional methods (e.g., bolts) such that the resilient layer 301 is prevented from bouncing off the top side 319 of the planar frame structure 307 during the collision. The thickness of the resilient layer 301 may be between 20 and 30 centimeters, or may also change depending on the size of the mast 119.

Figure 8:
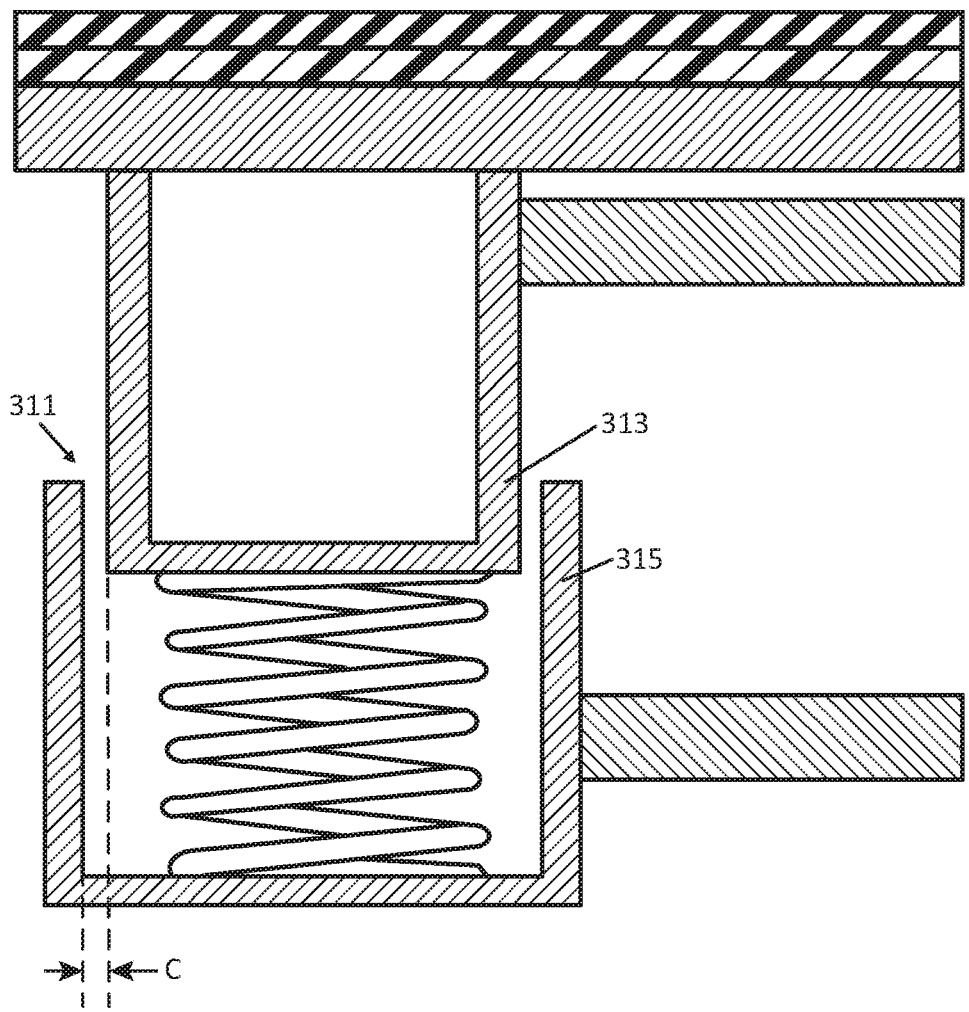
FIG. 8 shows a partial cross-sectional view of an apparatus in accordance with one or more embodiments.

The plurality of vertical supports 311 are connected to a bottom side 321 of the planar frame structure 307 to support the planar frame structure 307 from below. Each of the plurality of vertical supports 311 may include a first vertical support member 313 and a second vertical support member 315 arranged in a telescoping manner. A resilient member 317 is disposed between the first and the second vertical support members 313, 315. Specifically, the second vertical support member 315 may be a hollow structure having an open longitudinal end 323 and a closed longitudinal end 325, and the resilient member 317 is disposed inside and fixed to the closed longitudinal end 325 of the second vertical support member 315. The first vertical support member 313 includes an upper end 327 connected to the bottom side 321 and a lower end 329 in contact with the resilient member 317. This configuration of the vertical supports 311 allows the resilient member 317 to be deformable in response to a telescoping movement between the first vertical support member 313 and the second vertical support member 315. The second vertical support member 315 has an inner diameter that is larger than an outer diameter of the first vertical support member 313 by a clearance c, as shown in FIG. 8, such that the first vertical support member 313 moves along and inside the second vertical support member 315 while wobbling of the first vertical support member 313 is minimized. For example, the clearance c of the shock absorber stand 109 may be between 1 and 2 millimeters and may change depending on size of the first and the second vertical support members 313, 315. Further, a lubricant, such as grease, may be applied to the outer surface of the first vertical support members 313 and the inner surface of the second vertical support members 315 for a smooth telescoping movement between the first and the second vertical support members 313, 315.

Figure 9:
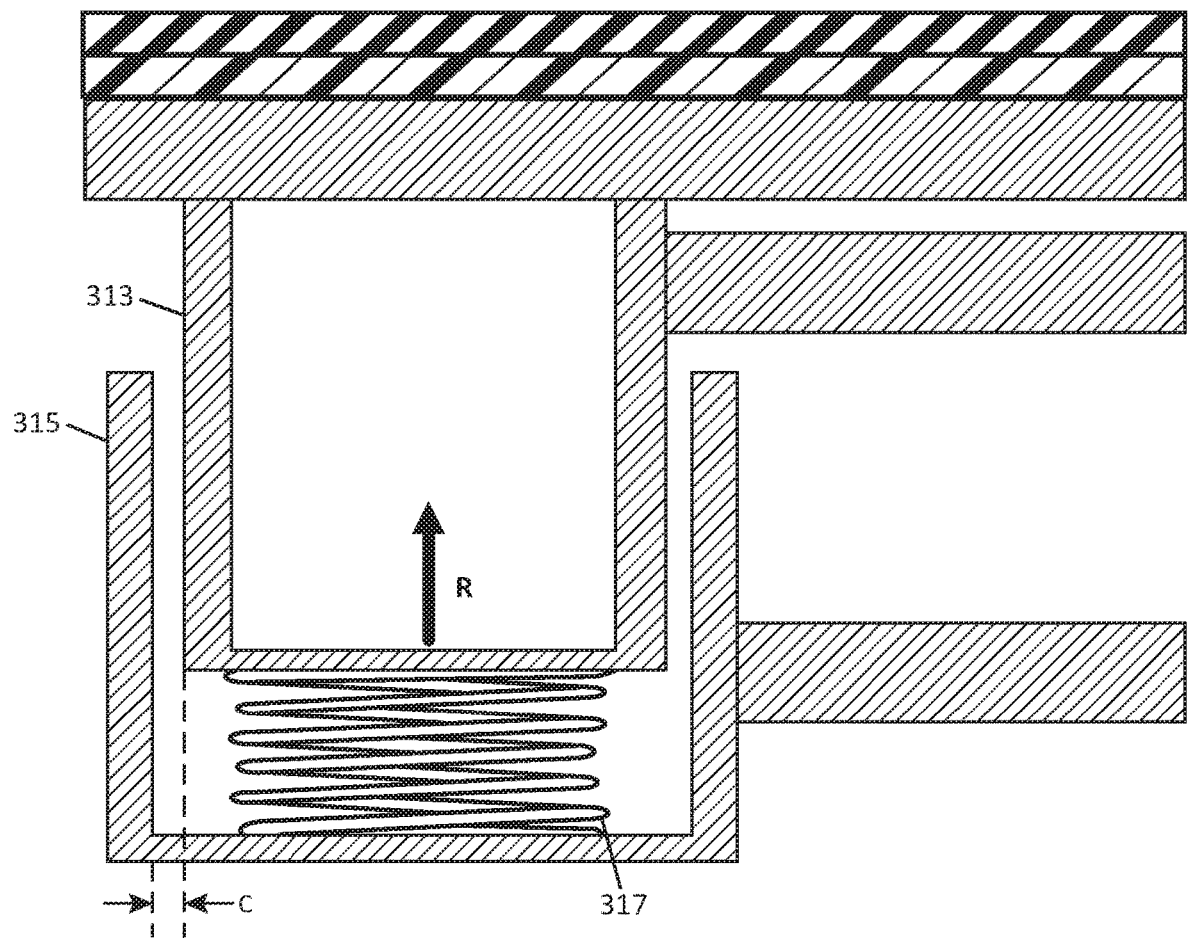
FIG. 9 shows a partial cross-sectional view of an apparatus in accordance with one or more embodiments.

The resilient member 317 of the shock absorber stand 109 in accordance with one or more embodiments may be springs or stacks of waveform washers (e.g., Belleville washers) having physical properties sufficient to support the load imposed on the shock absorber stand 109 due to fall of the mast 119. The telescoping movement between first and second vertical support members 313, 315 compresses the resilient member 317 when the mast 119 falls onto the shock absorber stand 109, and the reaction force R due to the deformation of the resilient member 317 supports the first vertical support member 313 from below, as illustrated in FIG. 9. A method of using the shock absorber stand 109 may include calculating an expected load due to an uncontrollable fall of a mast 119, and determining the resilient member 317 for supporting the expected load of the mast 119. With known physical properties of the resilient member 317, one skilled in the art would readily appreciate how the resilient members 317 sufficiently absorb the impacts due to the falling accidents.

Figure 4:
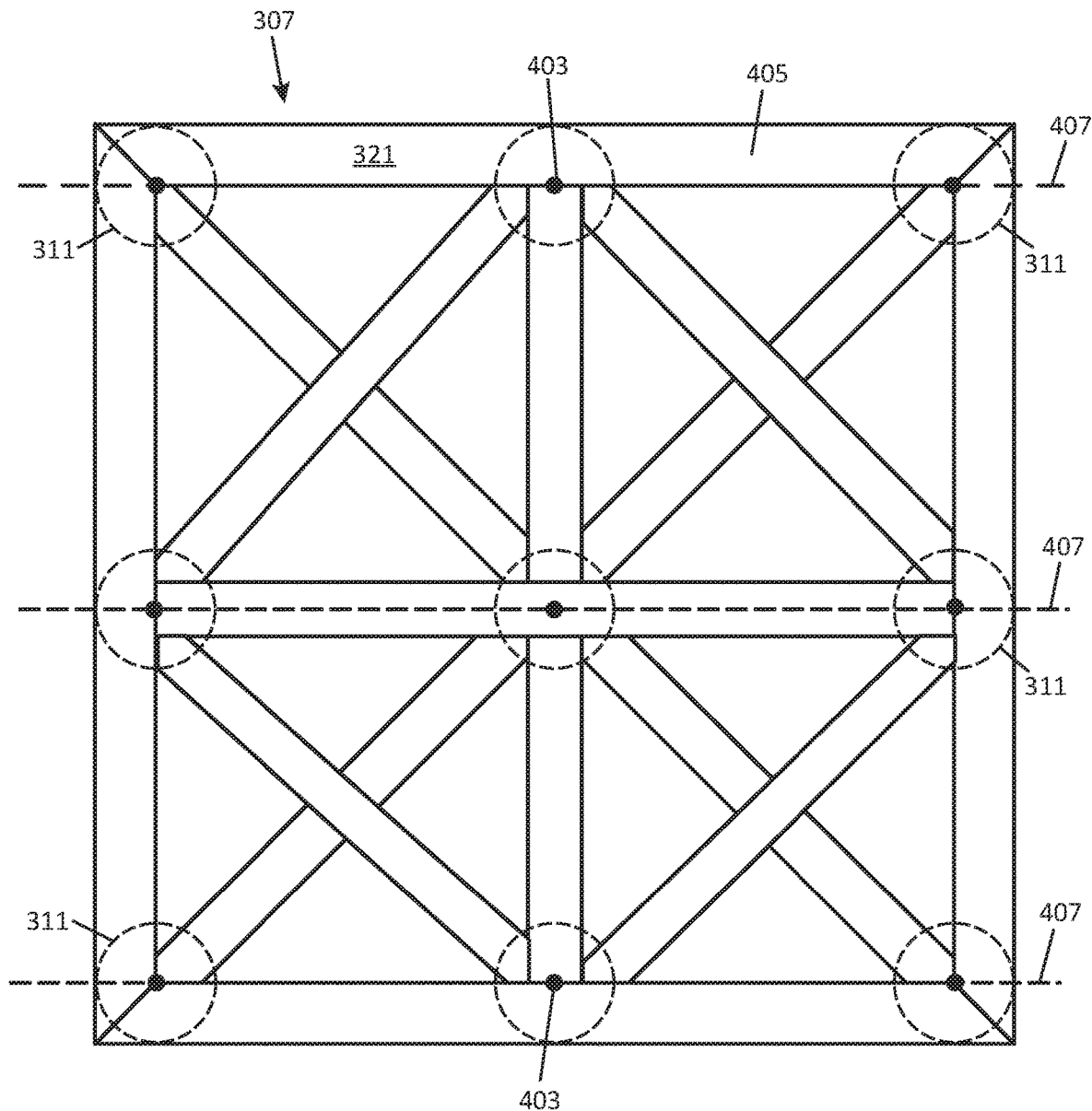
FIG. 4 shows a bottom view of a planar frame structure in accordance with one or more embodiments.
Figure 10A:
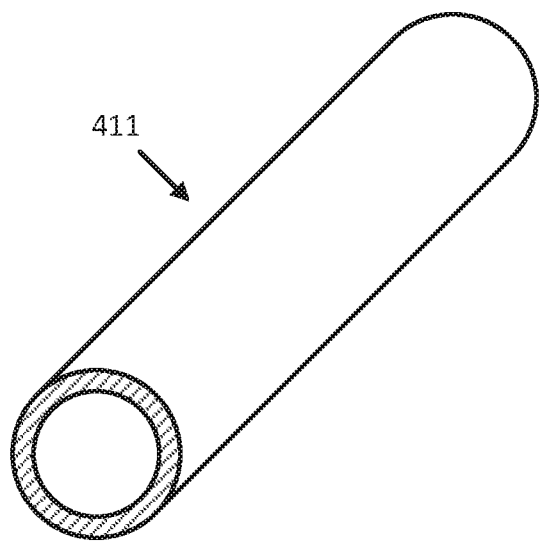
FIG. 10A shows a bar structure in the form of a pipe.
Figure 10B:
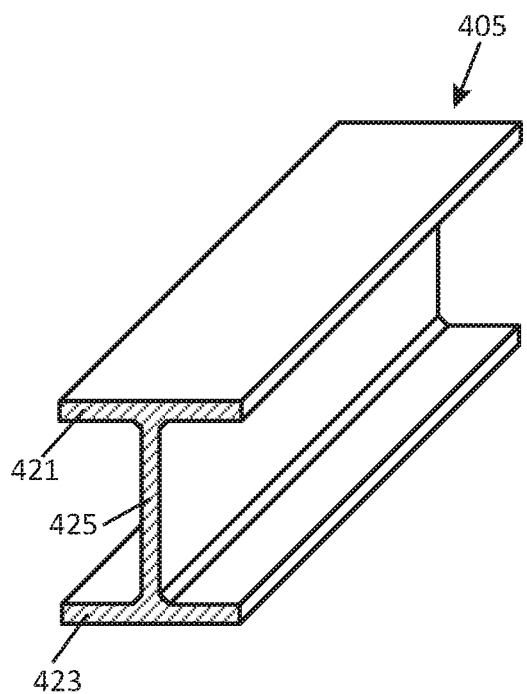
FIG. 10B shows a bar structure in the form of a beam.

FIG. 4 shows a bottom view of a planar frame structure 307 in accordance with one or more embodiments. A plurality of bar structures 405 may be connected through conventional methods (e.g., welds and bolts) such that the planar frame structure 307 becomes a form of a square, rectangular, or irregular shape depending on the size and dimension of the mast 119. For example, a planar frame structure 307 in accordance with one or more embodiments may be a combination of embodiments of different shapes to conform with the contact side 201 of the mast 119 if the contact side 201 requires an irregular shape for a support. The plurality of bar structures may include pipes 411, as shown in FIG. 10A, or beams 405, as shown in FIG. 10B, or both in accordance with one or more embodiments.

Figure 10C:
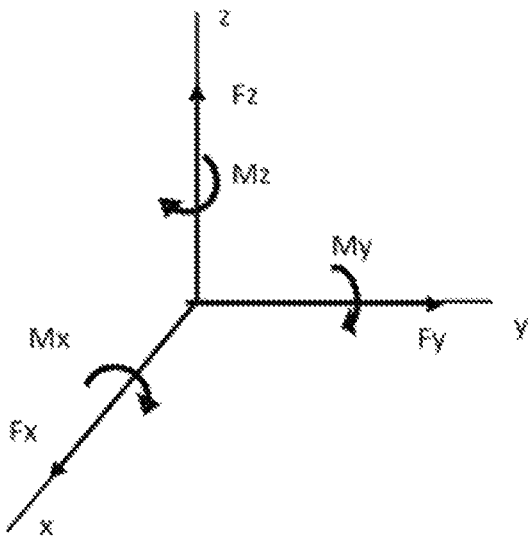
FIG. 10C shows a force representation indicating loading and bending on the beam of FIG. 10B.

Beams 405 may include at least one of standard I-beams, W-beams, S-beams, and customized beams that are designed and manufactured to bear load efficiently. Specifically, as shown in FIG. 10B, a beam may include an upper flange 421 and a lower flange 423 integrally connected with a web 425. Such configuration gives resistance in loading in a vertical axis z of the beam 405 and in bending about an axis y that is perpendicular to both a longitudinal axis x and the vertical axis z of the beam 405. More specifically, FIG. 10C shows a force representation indicating x, y, z axes and the directions of the loadings and bendings with respect to each of the axes. The beam 405 having the upper and the lower flanges 421, 423 and the web 425 integrally connected together may be resistant to, at least, loadings $F_z$ and to bendings $M_y$, which enhances the resistance of the planar frame structure 307 against the mast 119 falling in z axis as the top side 319 and the bottom side 321 of the planar frame structure 307 are each made of upper flanges 421 and lower flanges 423 of the plurality of beams 405, respectively. Further, one skilled in the art would appreciate how the top side 319 made of beams with such shape enhances resistance of the planar frame structure 307 in indentation of the planar frame structure 307.

Figure 5:
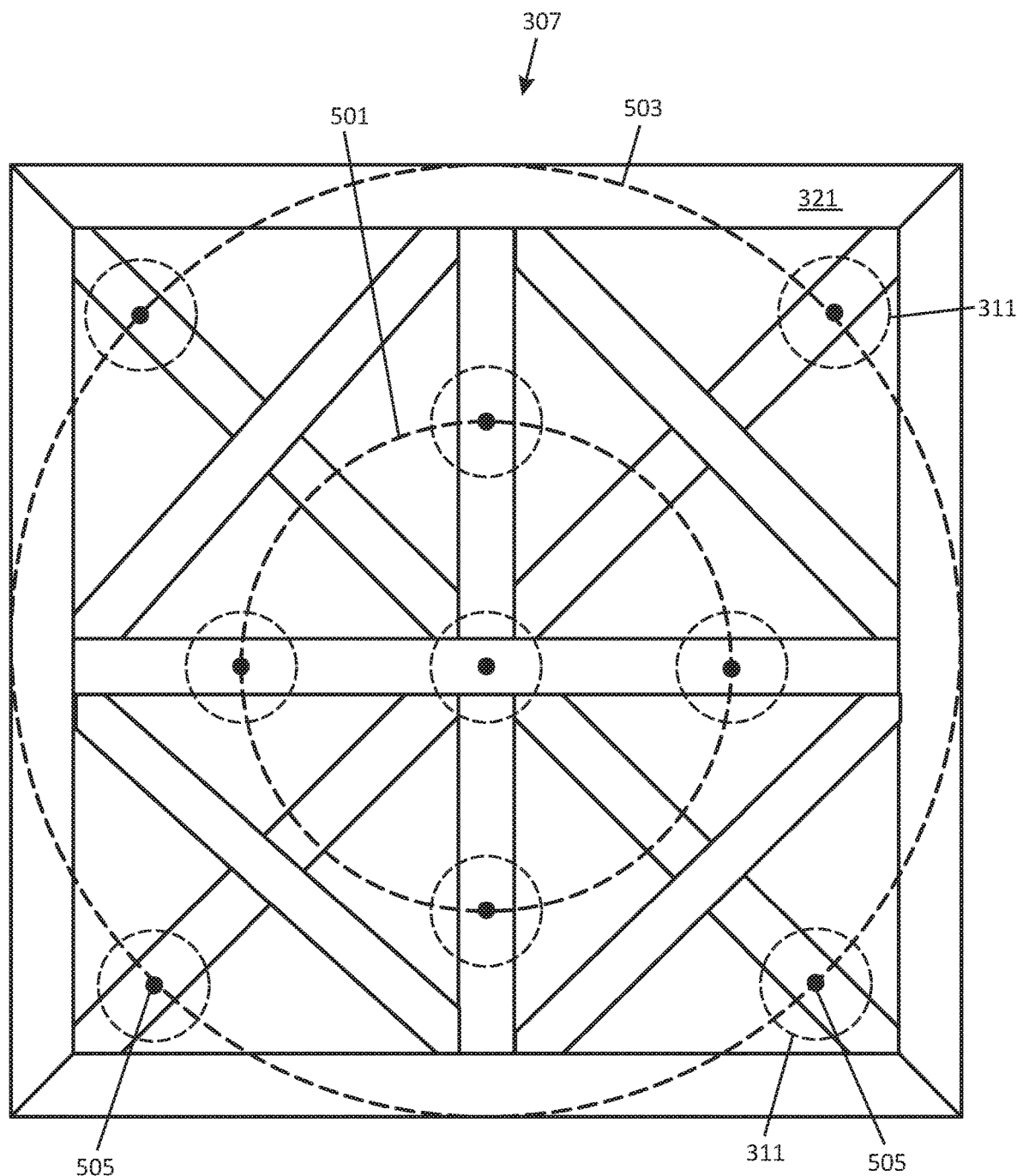
FIG. 5 shows a bottom view of a planar frame structure in accordance with one or more embodiments.

FIG. 4 further shows an arrangement for the plurality of vertical supports 311 (shown in FIG. 3) in accordance with one or more embodiments. Specifically, each longitudinal axis of the plurality of vertical supports 311 is aligned with points 403 on one or more paths 407 on the bottom side 321 of the planar frame structure. In other words, points 403 define the location of each of the vertical supports 311, and the arrangement and the number of the points 403 to be arranged on the one or more paths 407 may be determined based on the size and the dimension of the mast 119. For example, some embodiments of the shock absorber stand 109 may include the planar frame structure 307 having the plurality of vertical supports 311 arranged at square arrangements such as "n by n" points or rectangular arrangements such as "m by n" points, where m and n are integers. Other embodiments may include one or more enclosed paths 501, 503 that are offset from each other, as shown in FIG. 5 in which points 505 are distributed along the two circular paths 501, 503 that are offset from each other within the bottom side 321 of the planar frame structure. In this case, points 505 may not form a regular array.

Figure 6:
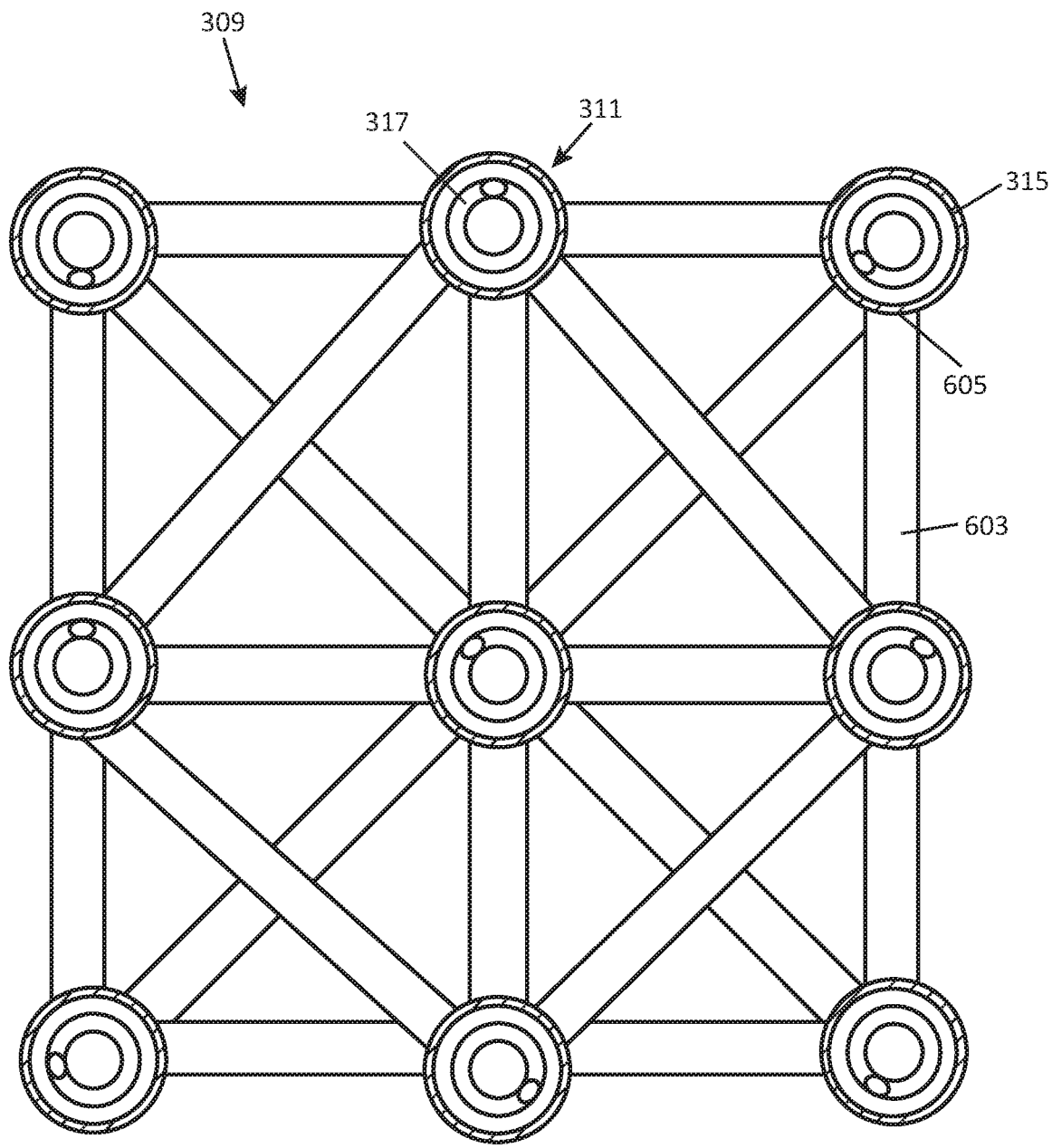
FIG. 6 shows a cross-sectional view of the apparatus of FIG. 3 along line A-A.

FIG. 6 shows a plurality of beams 603 connected to lateral sides 605 of the second vertical support members 315 by conventional methods such as welds and bolts. The plurality of beams 603 form connecting webs 309 (e.g., truss structures) between one or more pairs of consecutive vertical supports 311, thereby supporting and maintaining the arrangement of the plurality of vertical supports 311 on the planar frame structure 307. Such truss structures are formed near the upper end 327 of the first vertical support members 313 and near the closed longitudinal end 325 of the second vertical support members 315, which maintains the plurality of vertical supports 311 to be oriented vertically, as shown in FIG. 3.

Figure 7:
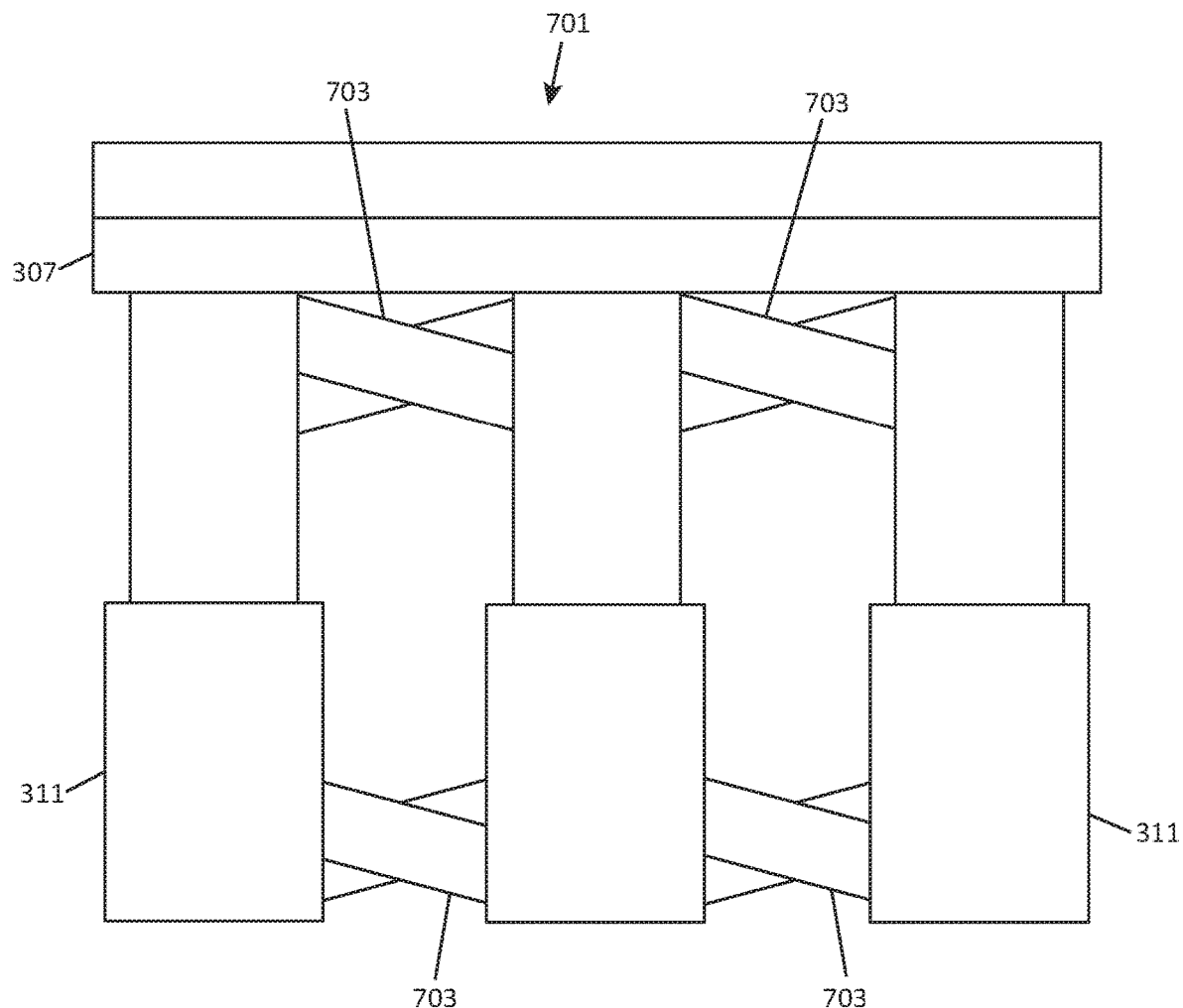
FIG. 7 shows a side view of an apparatus in accordance with one or more embodiments.

FIG. 7 shows a shock absorber stand 701 in accordance with one or more embodiments in which the connecting webs 703 are formed at an angle with respect to the longitudinal axis of the vertical supports 311. Such configuration of the connecting webs 703 further provides resistance in internal load of the shock absorber stand 701 and can be used when the size and the dimension of the mast 119 is expected to result in impacts directed away from the vertical axis of the shock absorber stand 701 when the mast 119 falls uncontrollably on the shock absorber stand 701. Connecting webs 703 in accordance with one or more embodiments may include the plurality of bar structures used in the planar frame structure 307 or a different combination of I-beams, W-beams, S-beams, pipes, and customized beams that are designed and manufactured to bear load efficiently.

FIG. 8 shows a partial view of the shock absorber stand 109 in a normal state in accordance with one or more embodiments. As previously discussed, the clearance c ensures that the telescoping movement between the first and the second vertical support members 313, 315 are smooth along the longitudinal axis of the vertical support 311 while wobbling of the first vertical support 313 members is minimized. FIG. 9 shows a partial view of the shock absorber stand 109 when an object (e.g., the mast 119) falls to the shock absorber stand 109 and compresses the resilient member 317 inside the second vertical support member 315. One skilled in the art would readily appreciate how the clearance between the first and the second vertical support members 313, 315 guides the telescoping movement along the longitudinal axis of the second vertical support member 315 such that the reaction force R from the resilient member 317 is directed upward without being deviated from the longitudinal axis of the vertical support 311.

A method of using the shock absorber stand 109 in an oil rig 101 in accordance with one or more embodiments may include determining a location to place a shock absorber stand 109 for protecting the mast 119 from falling uncontrollably to the ground. The location may correspond to a target point 205 of the mast 119, and once the mast is laid horizontally on the shock absorber 109, a contact side 201 of the mast 119 and a contact layer 203 of the shock absorber stand 109 become substantially parallel to each other. This ensures that the impact due to the falling is evenly distributed along the contact side 201 of the mast 119 instead of being concentrated at a point along the contact side 201. The target point 205 may be a point on the contact side 201 that minimizes internal load of the mast 119 when the mast 119 falls on the contact layer 203, thereby minimizing damages to the mast 119. For example, the shock absorber stand 109 may be positioned on the location to support a target point 205 that is at a tip of the mast 119. The shock absorber stand 109 in accordance with one or more embodiments may be used as a support while transporting the oil rig 101. Specifically, both of the mast 119 and the shock absorber stand 109 supporting the mast 119 at the location may be transported where the shock absorber stand 109 may be used as a support for the mast 119 while transporting the mast 119.

While the disclosure has been described with respect to a limited number of embodiments, those skilled in the art, having the benefit of this disclosure, will appreciate that other embodiments can be devised that do not depart from the scope of the disclosure as described. Accordingly, the scope of the disclosure should be limited only by the accompanying claims.

What is claimed is:

1. An apparatus comprising;
   a planar frame structure having a top side and a bottom side;
   a resilient layer disposed on the top side;
   a plurality of vertical supports positioned to support the planar frame structure from below, each of the vertical supports having a first vertical support member and a second vertical support member in a telescoping arrangement and a resilient member positioned between the first vertical support member and the second vertical support member, the first vertical support member coupled to the bottom side of the planar frame structure, the resilient member deformable in response to a telescoping movement between the first vertical support member and the second vertical support member; and
   a plurality of connecting webs formed between the vertical supports,
   wherein an inner diameter of the second vertical support member is larger than an outer diameter of the first vertical support member by a clearance.

2. The apparatus according to claim 1,
   wherein the planar frame structure comprises a plurality of bar structures including pipes and beams, each beam comprising: a longitudinal axis, a vertical axis, an upper flange and a lower flange, and
   wherein the upper flange and the lower flange are integrally connected with a web for resistance to loading in the vertical axis and to bending about an axis perpendicular to both the longitudinal axis and the vertical axis.

3. The apparatus according to claim 2, wherein each beam is connected such that the top side of the planar frame structure is formed by a plurality of upper flanges and the bottom side of the planar frame structure is formed by a plurality of lower flanges.

4. The apparatus according to claim 1, wherein the resilient layer comprises a plurality of layers of different hardness stacked to conform to the top side, the plurality of layers being harder in a lower portion than in an upper portion of the resilient layer.

5. The apparatus according to claim 1, wherein the second vertical support member is a hollow structure having an open longitudinal end and a closed longitudinal end, and the resilient member is fixed to the closed longitudinal end.

6. The apparatus according to claim 1, wherein the first vertical support member comprises an upper longitudinal end coupled to the bottom side and a lower longitudinal end in contact with the resilient member.

7. The apparatus according to claim 1, wherein the plurality of connecting webs are a truss structure connected to lateral sides of adjacent vertical supports to maintain the plurality of vertical supports in a vertical orientation.

8. The apparatus according to claim 1, wherein the plurality of vertical supports are longitudinally aligned with a plurality of points on one or more paths defined on the bottom side of the planar frame structure, the number of points related to a size of a mast.

9. A system of an oil rig, the system comprising:
a mast with a target point and a contact side;
an external drive coupled to the mast;
an apparatus comprising:
- a planar frame structure having a top side and a bottom side;
- a resilient layer disposed on the top side;
- a plurality of vertical supports positioned to support the planar frame structure from below, each of the vertical supports having a first vertical support member and a second vertical support member in a telescoping arrangement and a resilient member positioned between the first vertical support member and the second vertical support member, the first vertical support member coupled to the bottom side of the planar frame structure, the resilient member deformable in response to a telescoping movement between the first vertical support member and the second vertical support member; and
- a plurality of connecting webs formed between the vertical supports;

wherein the apparatus is disposed near the mast to prevent the mast from falling onto a ground.

10. The system according to claim 9,
wherein the planar frame structure comprises a plurality of bar structures including pipes and beams, each beam comprising: a longitudinal axis, a vertical axis, an upper flange and a lower flange, and
wherein the upper flange and the lower flange are integrally connected with a web for resistance to loading in the vertical axis and to bending about an axis perpendicular to both the longitudinal axis and the vertical axis.

11. The system according to claim 10, wherein each beam is connected such that the top side of the planar frame structure is formed by a plurality of upper flanges and the bottom side of the planar frame structure is formed by a plurality of lower flanges.

12. The system according to claim 9, wherein the resilient layer comprises a plurality of layers of different hardness stacked to conform to the top side, the plurality of layers being harder in a lower portion than in an upper portion of the resilient layer.

13. The system according to claim 9, wherein the second vertical support member is a hollow structure having an open longitudinal end and a closed longitudinal end, and the resilient member is fixed to the closed longitudinal end.

14. The system according to claim 9, wherein the first vertical support member comprises an upper longitudinal end coupled to the bottom side and a lower longitudinal end in contact with the resilient member.

15. The system according to claim 9, wherein an inner diameter of the second vertical support member is larger than an outer diameter of the first vertical support member by a clearance.

16. The system according to claim 9, wherein the plurality of connecting webs are a truss structure connected to lateral sides of adjacent vertical supports to maintain the plurality of vertical supports in a vertical orientation.

17. The system according to claim 9, wherein the plurality of vertical supports are longitudinally aligned with a plurality of points on one or more paths defined on the bottom side of the planar frame structure, the number of points related to a size of the mast.

18. A method comprising:
determining a location on a floor of a rig site corresponding to a target point of a mast pivotally coupled to a substructure at the rig site when the mast is oriented horizontally relative to the floor;
positioning a shock absorber stand at the location;
pivoting the mast to raise or lower the mast relative to the floor; and
absorbing a shock resulting from a collision of the mast with the shock absorber stand during pivoting of the mast, the absorbing by a resilient layer of the shock absorber stand positioned to contact the mast during the collision and by a plurality of resilient members positioned in a plurality of telescoping vertical supports of the shock absorber stand.

19. The method according to claim 18 further comprises transporting the mast oriented horizontally relative to the floor and supported by the shock absorber stand at the location to a different location.

\* \* \* \* \*